(12) United States Patent
Furukawa et al.

(10) Patent No.: US 12,181,689 B2
(45) Date of Patent: Dec. 31, 2024

(54) LIGHT-DISTRIBUTION ADJUSTMENT SHEET AND DISPLAY UNIT

(71) Applicant: SATURN LICENSING LLC, New York, NY (US)

(72) Inventors: Norimasa Furukawa, Tokyo (JP); Mitsuhiko Taki, Aichi (JP); Ichiro Utsumi, Tokyo (JP); Kenichi Nakaki, Tokyo (JP)

(73) Assignee: SATURN LICENSING LLC, New York, NY (US)

( * ) Notice: Subject to any disclaimer, the term of this patent is extended or adjusted under 35 U.S.C. 154(b) by 0 days.

(21) Appl. No.: 18/233,915

(22) Filed: Aug. 15, 2023

(65) Prior Publication Data
US 2024/0053515 A1    Feb. 15, 2024

Related U.S. Application Data

(63) Continuation of application No. 17/559,345, filed on Dec. 22, 2021, now Pat. No. 11,768,318, which is a continuation of application No. 16/809,090, filed on Mar. 4, 2020, now Pat. No. 11,237,303, which is a continuation of application No. 15/316,643, filed as application No. PCT/JP2015/063787 on May 13, 2015, now Pat. No. 10,620,347.

(30) Foreign Application Priority Data

Jun. 13, 2014    (JP) .................................. 2014122801

(51) Int. Cl.
G02B 3/00        (2006.01)
G02B 3/02        (2006.01)
G02F 1/1335      (2006.01)

(52) U.S. Cl.
CPC ............... *G02B 3/005* (2013.01); *G02B 3/02* (2013.01); *G02F 1/1335* (2013.01); *G02F 1/133526* (2013.01); *G02F 1/133562* (2021.01)

(58) Field of Classification Search
CPC ........ G02B 3/00; G02B 3/005; G02B 3/0056; G02B 3/08; G02B 5/045; G02B 3/02; G02F 1/1335; G02F 1/133526; G02F 1/133606; G02F 1/133615; G02F 1/133562; G03B 21/602; G03B 21/625
USPC .......... 359/741, 613, 621, 619, 455; 349/95, 349/61–71
See application file for complete search history.

(56) References Cited

U.S. PATENT DOCUMENTS

| | | |
|---|---|---|
| 5,555,476 A | 9/1996 | Suzuki et al. |
| 6,784,962 B2 | 8/2004 | Sumida et al. |
| 7,339,638 B2 | 3/2008 | Kitamura |
| 8,823,254 B2 | 9/2014 | Ohta et al. |

(Continued)

FOREIGN PATENT DOCUMENTS

| | | |
|---|---|---|
| CN | 102914907 A | 2/2013 |
| JP | H07043704 A | 2/1995 |

(Continued)

*Primary Examiner* — Jie Lei
(74) *Attorney, Agent, or Firm* — Richard LaPeruta (57) ABSTRACT

A display unit of the disclosure includes a display panel and a light-distribution adjustment sheet. The light-distribution adjustment sheet is provided on the display panel, and includes a protrusion that protrudes toward the display panel. The protrusion includes a first region including a curved surface, and a second region including a flat surface.

20 Claims, 9 Drawing Sheets

(56) References Cited

U.S. PATENT DOCUMENTS

| | | |
|---|---|---|
| 11,237,303 B2 | 2/2022 | Furukawa et al. |
| 11,768,318 B2 * | 9/2023 | Furukawa .............. G02B 3/005 359/741 |
| 2003/0020399 A1 | 1/2003 | Moller et al. |
| 2008/0002105 A1 | 1/2008 | Park et al. |
| 2009/0225538 A1 | 9/2009 | Horikoshi et al. |
| 2013/0033893 A1 | 2/2013 | Ando et al. |

FOREIGN PATENT DOCUMENTS

| | | |
|---|---|---|
| JP | H07120743 A | 5/1995 |
| JP | 2000352711 A | 12/2000 |
| JP | 200142365 A | 2/2001 |
| JP | 2002189212 A | 7/2002 |
| JP | 2005275142 | 10/2005 |
| JP | 2009272068 A | 11/2009 |
| JP | 2014048362 A | 3/2014 |

* cited by examiner

LIGHT-DISTRIBUTION ADJUSTMENT SHEET AND DISPLAY UNIT

CROSS REFERENCE TO RELATED APPLICATIONS

This application is a U.S. National Phase of International Patent Application No. PCT/JP2015/063787 filed on May 13, 2015, which claims priority benefit of Japanese Patent Application No. JP 2014-122801 filed in the Japan Patent Office on Jun. 13, 2014. Each of the above-referenced applications is hereby incorporated herein by reference in its entirety.

TECHNICAL FIELD

The disclosure relates to a light-distribution adjustment sheet that may be used for apparatuses such as a television apparatus, and to a display unit including this sheet.

BACKGROUND ART

Liquid crystal molecules have birefringence, and have refractive index anisotropy, or a property that a refractive index varies depending on a passing direction of light. A liquid crystal display is a display unit that uses the liquid crystal molecules as an optical switch, and displays an image by electrically operating transmission and blocking of light, with utilization of a change in the refractive index due to a change in molecular sequence (alignment) of the liquid crystal molecules caused by application of an electric field.

In the liquid crystal display, polarized light is used as the light to pass therethrough. Out of the light passing through a liquid crystal layer having a certain thickness, obliquely-advancing light has a long passage distance in the liquid crystal layer and is readily affected by the change in the refractive index due to the liquid crystal molecules, which may result in, for example, a significant change in a vibration axis of the polarized light. This change in the vibration axis of the polarized light lowers a function as the optical switch (blocking/transmission) and display characteristics (in particular, contrast) of the liquid crystal molecules. In particular, influence thereof is noticeable as viewed in an oblique direction.

For the liquid crystal display, various liquid crystal modes have been developed to reduce the anisotropy of the refractive index due to the liquid crystal molecules. In each of the various liquid crystal modes, an inner structure of a display panel is devised. But effects thereof are far from sufficient. For example, in an MVA (multi-domain vertical alignment) mode, a plurality of regions that vary in alignment direction of liquid crystal molecules may be formed (alignment division thereof is performed) in one pixel unit. The refractive index anisotropy may be reduced by averagely neutralizing the alignment direction. But an effect of improving a viewing angle characteristic in the oblique direction may be low. In an IPS (in-plane switching) mode, a change in optical characteristics due to a viewing angle is reduced by constantly rotating liquid crystal molecules in a plane with respect to a substrate. But an effect thereof is noticeably low in a certain direction. In addition, in recent years, the number of pixels has increased due to upsizing and higher definition of display units, and greater complexity of the inner structure has caused an increase in costs of patterning and other processes.

Therefore, a method of improving the viewing angle characteristic in an outside of the display panel has been developed. For example, Patent Literature 1 discloses a liquid crystal display in which a lens sheet is disposed on a front face of a liquid crystal panel. In the lens sheet, columnar lenses or prismatic prism lenses are arranged in one direction.

CITATION LIST

Patent Literature

Patent Literature 1: JP 2001-42365A

SUMMARY OF INVENTION

Although the anisotropy of the refractive index is reduced to some extent, however, the liquid crystal display having the above-described configuration fails to provide sufficient improvement in the viewing angle characteristic.

It is therefore desirable to provide a light-distribution adjustment sheet and a display unit that allow for enhancement in a viewing angle characteristic.

A light-distribution adjustment sheet according to an embodiment of the technology includes a protrusion that protrudes in one direction. The protrusion includes a first region including a curved surface, and a second region including a flat surface.

In the light-distribution adjustment sheet according to the embodiment of the technology, the protrusion protrudes in one direction, and includes the first region including the curved surface, and the second region including the flat surface. This makes it possible to adjust a light-distribution direction of light that enters from side on which the protrusion is disposed.

A display unit according to an embodiment of the technology includes a display panel and a light-distribution adjustment sheet. The light-distribution adjustment sheet is provided on the display panel, and includes a protrusion that protrudes toward the display panel. The protrusion includes a first region including a curved surface, and a second region including a flat surface.

In the display unit according to the embodiment of the technology, the light-distribution adjustment sheet is disposed on the display panel. The light-distribution adjustment sheet includes the protrusion. The protrusion protrudes toward the display panel, and includes the first region including the curved surface, and the second region including the flat surface. This allows for adjustment of a light-distribution direction of light emitted from the display panel toward a front face.

According to the light-distribution adjustment sheet and the display unit of the respective embodiments of the technology, the light-distribution adjustment sheet is disposed on the display panel. The light-distribution adjustment sheet includes the protrusion. The protrusion protrudes in one direction (for example, toward the display panel), and includes the first region including the curved surface, and the second region including the flat surface. This allows for the adjustment of the light-distribution direction of the light that enters from the side on which the protrusion is disposed (the light emitted from the display panel). Hence, it is possible to enhance a viewing angle characteristic of the display unit. It is to be noted that the effect described herein is not necessarily limitative, and may be any of effects described in the disclosure.

MODE(S) FOR CARRYING OUT THE INVENTION

Embodiments of the disclosure are described below in detail with reference to the drawings, in the following order.
1. Embodiment (an example in which adjacent first regions with a second region interposed therebetween have curvatures same as each other)
   1-1. Basic Configuration
   1-2. Workings and Effects
2. Modification Example (an example in which adjacent first regions with a second region interposed therebetween have curvatures different from each other)
3. Application Examples

1. Embodiment (1-1. Basic Configuration)

Figure 1:
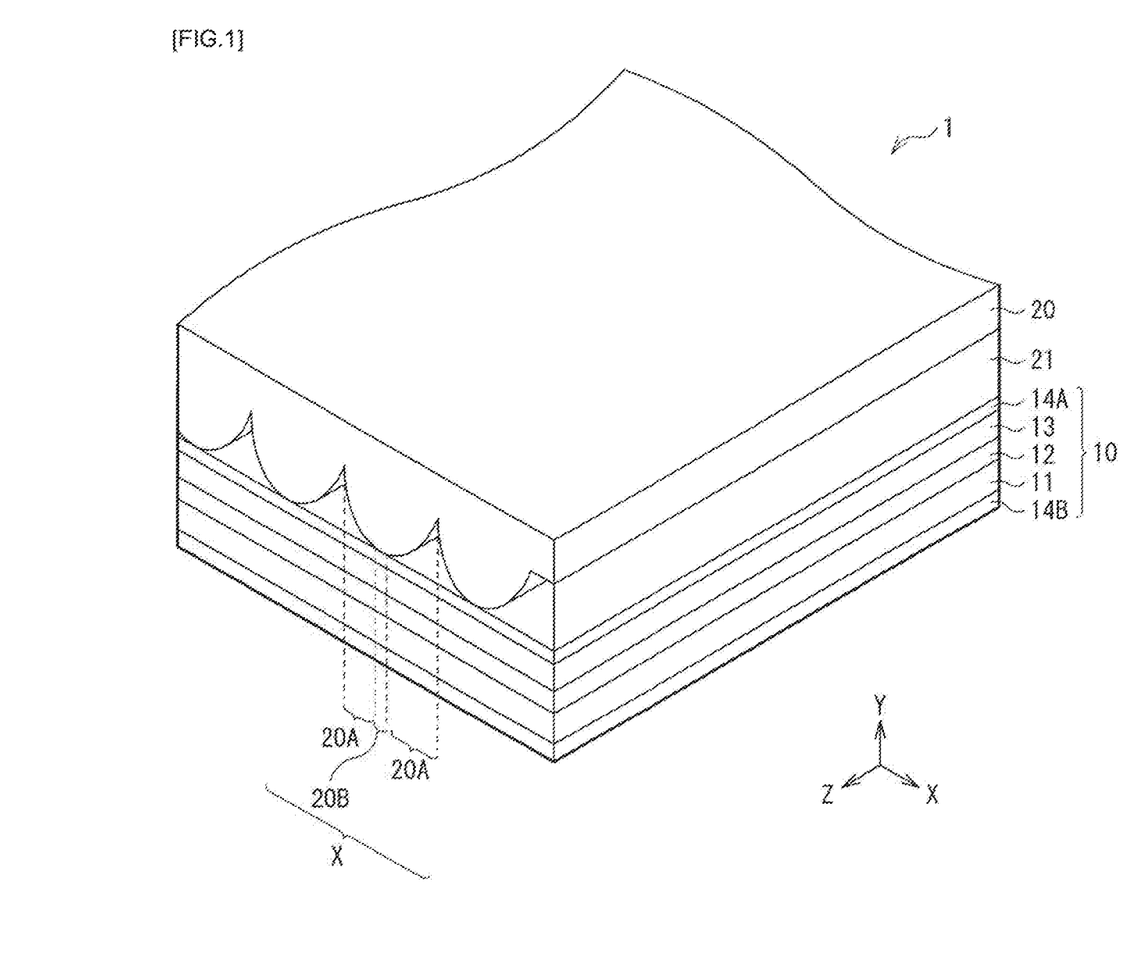
FIG. 1 is a perspective view of a part of a configuration of a display unit according to an embodiment of the disclosure.

FIG. 1 illustrates a part (a display panel 10 and a light-distribution adjustment sheet 20) of a configuration of a display unit (a display unit 1) according to an embodiment of the disclosure. In the display unit 1, the light-distribution adjustment sheet 20 may be disposed on a front face (on display-surface side) of the display panel 10.

The light-distribution adjustment sheet 20 may adjust a light-distribution direction of light, and include a plurality of protrusions X. The plurality of protrusions X protrude toward the display panel 10 and extend in one direction (here, a Z-axis direction), as illustrated in FIG. 1. Light emitted from the display panel 10 toward the front face (here, in a Y-axis direction) may pass through the protrusions X, and be distributed in any direction. The light-distribution adjustment sheet 20 may be made of, for example, polyethylene terephthalate (PET), acrylic resin (PMMA), polycarbonate (PC), or other materials.

Figure 2:
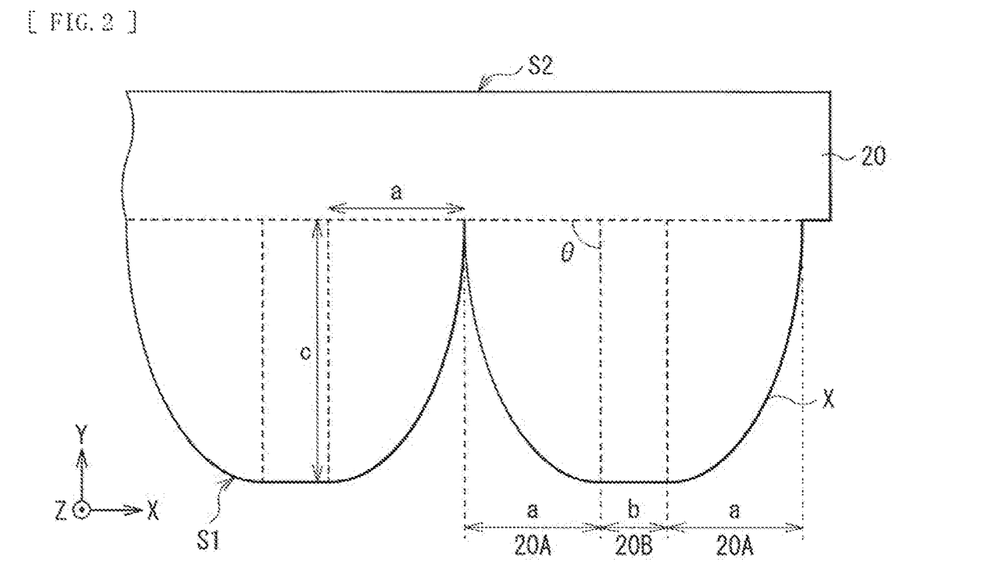
FIG. 2 is a cross-sectional view of a main-part configuration (a light-distribution adjustment sheet) of the display unit illustrated in FIG. 1.

FIG. 2 illustrates a cross-sectional configuration of the light-distribution adjustment sheet 20 in an X-axis direction. The protrusion X includes a side surface (a first region 20A) having a certain curvature, and a flat undersurface (a second region 20B). A surface (a protruding surface S1) of the protrusion X may include a curved surface formed in each of the first regions 20A, and a flat surface formed in the second region 20B. The protruding surface S1 of the protrusion X may be devoid of an inflection point. In other words, the protruding surface S1 of the protrusion X may form a differentiable continuous surface free of discontinuous points. The first region 20A may have a predetermined curvature, and be so designed that, when two curved surfaces (the first regions 20A) formed on both sides of the flat surface forming the second region 20B are combined, a central angle of an elliptical arc is $\pi$ (rad). In other words, in the protrusion X, the curved surface (the first region 20A) being $\pi/2$ (rad) may be formed on each of both sides of the flat surface (the second region 20B). The light emitted from the display panel 10 toward the front face may be refracted in the first region 20A, and pass through to outside in the second region 20B, substantially without being refracted.

In one preferred example, a width ($2a+b$, where a formation width of the first region 20A is assumed to be a, and a formation width of the second region 20B is assumed to be b) of each of the protrusions X may be, for example, smaller than a width of one pixel (1 pitch), in which the pixel is one unit formed by combining color pixels (subpixels; for example, a red pixel (R), a green pixel (G), and a blue pixel (B)). In other words, in one preferred example, one or more of the protrusions X may be disposed for one pixel. In another preferred example, two or more of the protrusions X may be disposed for one pixel. In one more preferred example, the protrusion X may be disposed for each of subpixels (R, and B) forming a pixel. Specifically, when the width of the pixel is assumed to be 1, the width ($2a+b$) of the protrusion X may be less than 1, preferably 0.5 or less, and more preferably 0.33 or less.

Further, the formation regions (widths) in the X-axis direction of the respective regions, i.e., the first region 20A and the second region 20B included in the protrusion X, may be at a predetermined ratio. By changing the ratio (a:b (or $2a$:b)) between the formation width (a) of the first region 20A and the formation width (b) of the second region 20B, it is possible to make any adjustment of a ratio between light components (light (refracted light) refracted by the curved surface of the first region 20A and light (non-refracted light) not refracted by the flat surface of the second region 20B) to be distributed while passing through the protrusion X.

Figure 3A:
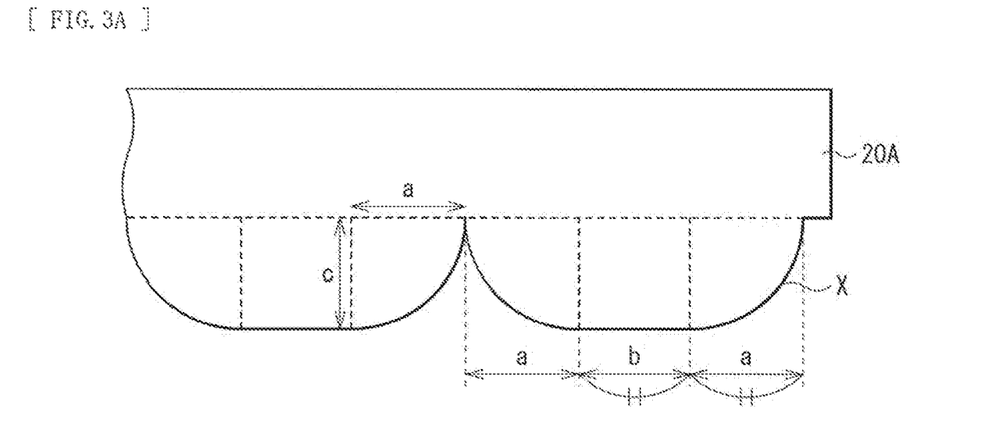
FIG. 3A is a cross-sectional view of another example of the light-distribution adjustment sheet illustrated in FIG. 1.
Figure 3B:
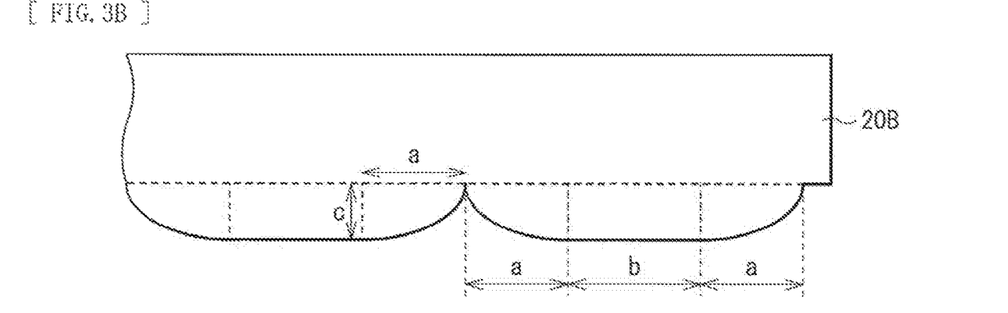
FIG. 3B is a cross-sectional view of another example of the light-distribution adjustment sheet illustrated in FIG. 1.
Figure 4:
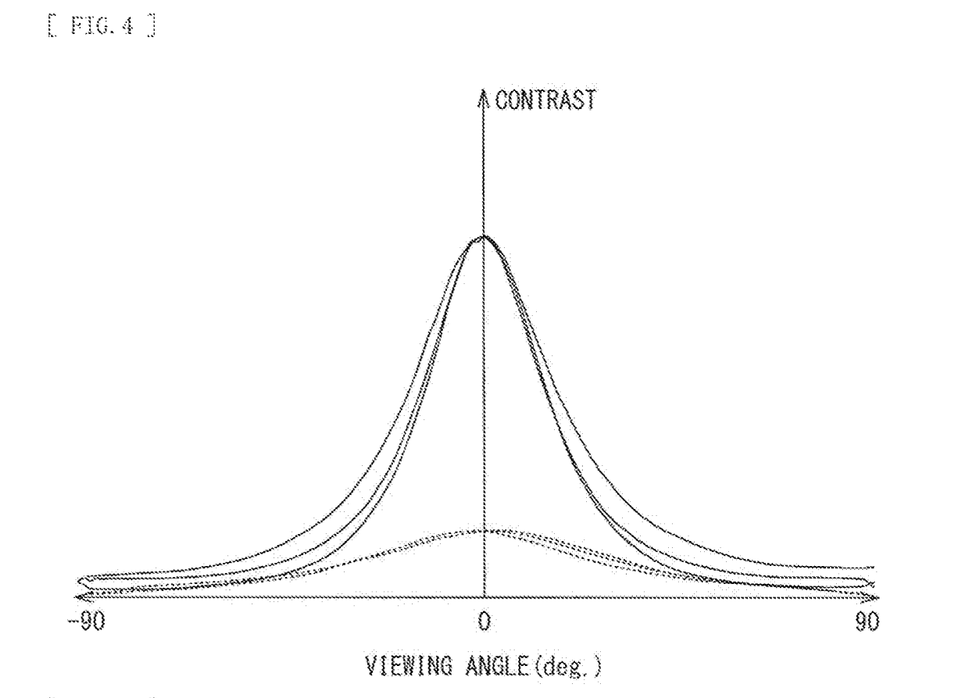
FIG. 4 is a characteristic diagram illustrating a relationship between a viewing angle and contrast in each of Example and Comparative Example.

It is to be noted that, in this embodiment, a shape of the protrusion X, in particular, a shape of the curved surface formed in the first region 20A is assumed to be an elliptical shape in which the X-axis direction is a minor axis and the Y-axis direction is a major axis, but this is not limitative. When the width of the first region 20A is assumed to be a, and a height of the protrusion X is assumed to be c, the shape of the curved surface illustrated in FIGS. 1 and 2 satisfies a<c. But the shape of the curved surface may be, for example, a circular shape satisfying a=c as illustrated in FIG. 3. Alternatively, the shape of the curved surface may be an elliptical shape satisfying a>c as illustrated in FIG. 4 with a reversal of the major axis and the minor axis in the protrusion X illustrated in FIGS. 1 and 2.

Furthermore, for example, in one preferred example, an antireflection surface treatment may be applied to a surface S2 opposite to the surface where the protrusion X of the light-distribution adjustment sheet 20 is provided. This suppresses outside-light reflection at the surface S2, thereby making it possible to enhance contrast in a bright place.

A resin layer 21 may be provided between the light-distribution adjustment sheet 20 and the display panel 10. The resin layer 21 may also serve as a bonding layer that bonds the light-distribution adjustment sheet 20 and the display panel 10 together. Examples of a material forming the resin layer 21 may include a material having a refractive index smaller than that of a resin material forming the light-distribution adjustment sheet 20, specifically, a material such as a refractive index control resin to be used for cladding or a lens, e.g., epoxy-based, acryl-based, and other resins. By filling a part between the display panel 10 and the light-distribution adjustment sheet 20 with the resin material of a low refractive index as in this embodiment, the outside-light reflection at the protruding surface S1 is suppressed and a decline in the contrast in the bright place is reduced. It is to be noted that the undersurface of the protrusion X of the alignment adjustment sheet 20 may be in contact with the display panel 10, or the resin layer 21 may be included therebetween.

Further, the display panel 10 and the light-distribution adjustment sheet 20 may be bonded together using an adhesive layer (not illustrated). In this case, the adhesive layer may be disposed between the display panel 10 and the resin layer 21.

A configuration of the display panel 10 is described below.

The display panel 10 may display an image such as a moving image and a still image, and include, for example, a display layer (here, a liquid crystal layer 12) between two substrates, which are a TFT substrate 11 and a color filter (CF) substrate 13. Polarizing plates 14A (on front-face side) and 14B (on back-face side) may be provided on surfaces (a front face (a display surface) and a back face) of the TFT substrate 11 and the CF substrate 13, respectively, the surfaces being opposite to the liquid crystal layer 12. The polarizing plates 14A and 14B may allow polarized light in a specific direction to pass therethrough.

The TFT substrate 11 may be a substrate in which, for example, a plurality of pixel electrodes (not illustrated) may be arranged in a matrix on a glass substrate. This TFT substrate 11 may be provided with a TFT (Thin Film Transistor) device that may drive each of these pixel electrodes, as well as a gate line, a source line, and other lines coupled to the TFT device (none of these illustrated). The pixel electrode may be made of, for example, a conductive material having transparency such as ITO (Indium Tin Oxide), and provided for each subpixel (not illustrated) on the glass substrate.

The CF substrate 13 may include a color filter (not illustrated) in which, for example, filters of red (R), green (G), and blue (B) may be provided in a stripe form on a glass substrate. The CF substrate 13 may also include a counter electrode (not illustrated) over a substantially entire surface in an effective display region (not illustrated) on this color filter. The counter electrode may be made of, for example, a conductive material having transparency such as ITO, as with the above-described pixel electrode. It is to be noted that, although not illustrated here, a spacer may be provided between the counter electrode and the pixel electrodes on the TFT substrate 11 side, to keep a gap between the substrates on both sides.

For example, in a vertical-alignment-type liquid crystal panel, the liquid crystal layer 12 may include a liquid crystal molecule and a polymer structure. The liquid crystal molecule may have negative dielectric anisotropy. The polymer structure may maintain the liquid crystal molecule near an interface with an alignment film (not illustrated). The liquid crystal molecule may have such a property that a dielectric constant in a major-axis direction thereof is larger than that in a minor-axis direction thereof. Due to this property, the liquid crystal molecules may be aligned in such a manner that a major axis of the liquid crystal molecule is perpendicular to the substrate when a drive voltage is off, whereas the liquid crystal molecules may be inclined and aligned in such a manner that the major axis of the liquid crystal molecule is parallel to the substrate when the drive voltage is on. An image may be thereby produced on a liquid crystal display panel. It is to be noted that the liquid crystal layer 12 may be sealed by a sealing section (not illustrated) provided around a peripheral edge of the liquid crystal layer 12, as well as between the TFT substrate 11 and the CF substrate 13.

A peripheral edge of the display panel 10 may be provided with, for example, a sealing resin layer (not illustrated). This allows for planarization of a shouldered end face of the display panel 10 as a combination of differently sized members (the substrates 12 and 13, as well as the polarizing plates 14A and 14B).

(1-2. Workings and Effects)

In the display unit 1, when light emitted from a light source enters the display panel 10 through an optical member (an optical member 15, see FIGS. 7 and 8) to be described later, this entering light may pass through the polarizing plate 14B, and then pass through the liquid crystal layer 12 while being modulated for each pixel, on the basis of an image voltage applied between the transparent electrodes of the TFT substrate 11 and the CF substrate 13. The light passing through the liquid crystal layer 12 may pass through the color filter, and thereby be extracted as color display light to outside (the display-surface side) of the polarizing plate 14A.

As described above, in a display unit (for example, a liquid crystal display) that utilizes molecules having refractive index anisotropy like the liquid crystal molecules as display elements, there is such a disadvantage that this refractive index anisotropy may result in degradation in display characteristics in a certain direction, an oblique direction in particular, specifically, a viewing angle characteristic. This may cause, for example, color variation on both ends of a screen.

To obviate such a disadvantage, for example, as in a mode such as the MVA mode, methods of improving the viewing angle characteristic by reducing the anisotropy of the refractive index in an inside of a display panel have been developed. It is, however, difficult for any of such methods to obtain a sufficient effect, and there is also a disadvantage of an increase in costs.

Therefore, as a simpler method, an attempt has been made to improve the viewing angle characteristic, by placing a light refraction sheet outside of a display panel, specifically, on a front face (the display-surface side) of the display panel, thereby reducing the anisotropy of the refractive index. Examples of the light refraction sheet may include a so-called lens sheet, a prism sheet, and a lenticular sheet. However, using the lens sheet has such a disadvantage that a compensation effect becomes excessive, thereby significantly decreasing front luminance, instead of improving peripheral luminance. In addition, there is such a disadvantage that bonding to the display panel is difficult because the entire convex-shaped part has a curved-surface shape. Moreover, in the prism sheet, a refraction interface is formed of a flat plane, and therefore, a direction of light refraction is limited to a specific direction, and it is difficult to say that the viewing angle characteristic is sufficiently improved. Further, as for the lenticular sheet, as with the lens sheet, bonding to the display panel is difficult because the entire convex-shaped part has a curved-surface shape.

In contrast, in the display unit 1 of this embodiment, the light-distribution adjustment sheet 20 is disposed on the front face of the display panel 10. The light-distribution adjustment sheet 20 includes the plurality of protrusions X. The plurality of protrusions X protrude toward the display panel 10, and each include the first region including the curved surface, and the second region including the flat surface. In this way, the light-entering surface (the protruding surface S1) of the light emitted from the display panel includes the curved surface (the first region 20A) and the flat surface. Accordingly, out of the light emitted from the display panel, light in one direction may be extracted to the outside as the refracted light, whereas light in another direction may be extracted to the outside as the non-refracted light. This makes it possible to expand a straightly-advancing component of modulated light passing through the polarizing plate 14A in various directions, and the refractive index anisotropy due to the liquid crystal molecules is improved.

Further, appropriately adjusting the ratio between the first region 20A including the curved surface and the second region 20B including the flat surface makes it possible to adapt to a change in a viewing angle optimum value attributed to each of liquid crystal modes (including, for example, a TN (twist nematic) mode, in addition to the MVA mode and the IPS mode described above).

Furthermore, the undersurface of the protrusion X provided in the light-distribution adjustment sheet 20 is a flat surface. Accordingly, this undersurface may serve as a bonding surface, which makes it possible to easily bond the light-distribution adjustment sheet 20 and the display panel 10 together.

Figure 5:
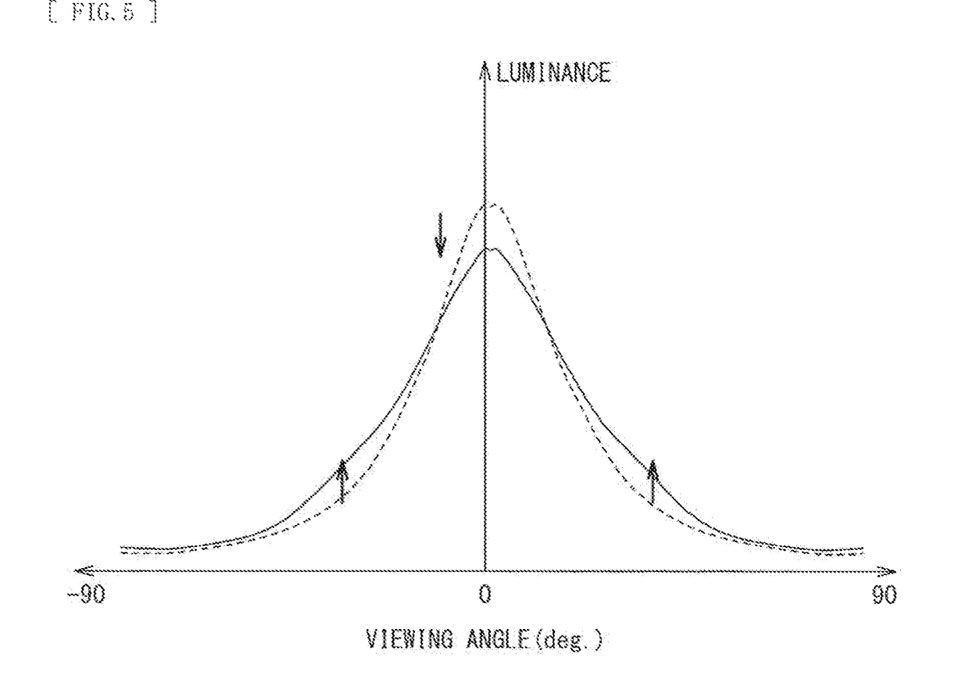
FIG. 5 is a characteristic diagram illustrating a relationship between a viewing angle and luminance in each of Example and Comparative Example.

FIG. 4 illustrates a relationship between a viewing angle and contrast in each of the display unit 1 (Example) with the alignment adjustment sheet 20 in this embodiment and a display unit (Comparative Example) without the alignment adjustment sheet 20. As appreciated from FIG. 4, the contrast is significantly improved and a range of the viewing angle is widened by providing the alignment adjustment sheet 20. FIG. 5 illustrates a relationship between the viewing angle and luminance in each of the display unit 1 (Example) with the alignment adjustment sheet 20 in this embodiment and the display unit (Comparative Example) without the alignment adjustment sheet 20, as with FIG. 4. As appreciated from FIG. 5, although front-face luminance is slightly decreased, luminance at a lower end part is increased, which proves improvement in the viewing angle characteristic.

As described above, in the display unit 1 of this embodiment, the light-distribution adjustment sheet 20 is disposed on the front face of the display panel 10. The light-distribution adjustment sheet 20 includes the plurality of protrusions X. The plurality of protrusions X protrude toward the display panel 10, and each include the first region including the curved surface, and the second region including the flat surface. This makes it possible to adjust the light-distribution direction of the light emitted from the display panel to the outside, and thereby to enhance the viewing angle characteristic of the display unit.

Further, in this embodiment, the resin layer made of the low refractive index resin may be provided between the display panel 10 and the light-distribution adjustment sheet 20, thereby filling a gap between the display panel 10 and the light-distribution adjustment sheet 20. Accordingly, diffusion and Fresnel reflection of the outside light at the protruding surface S1 of the protrusion X are reduced, which makes it possible to ensure a contrast ratio in the bright place.

In the following, a modification example and application examples according to the above-described embodiment are described. It is to be noted that components identical to those of the above-described embodiment are provided with reference characters identical to those of the above-described embodiment, and description thereof is omitted.

2. Modification Example

Figure 6:
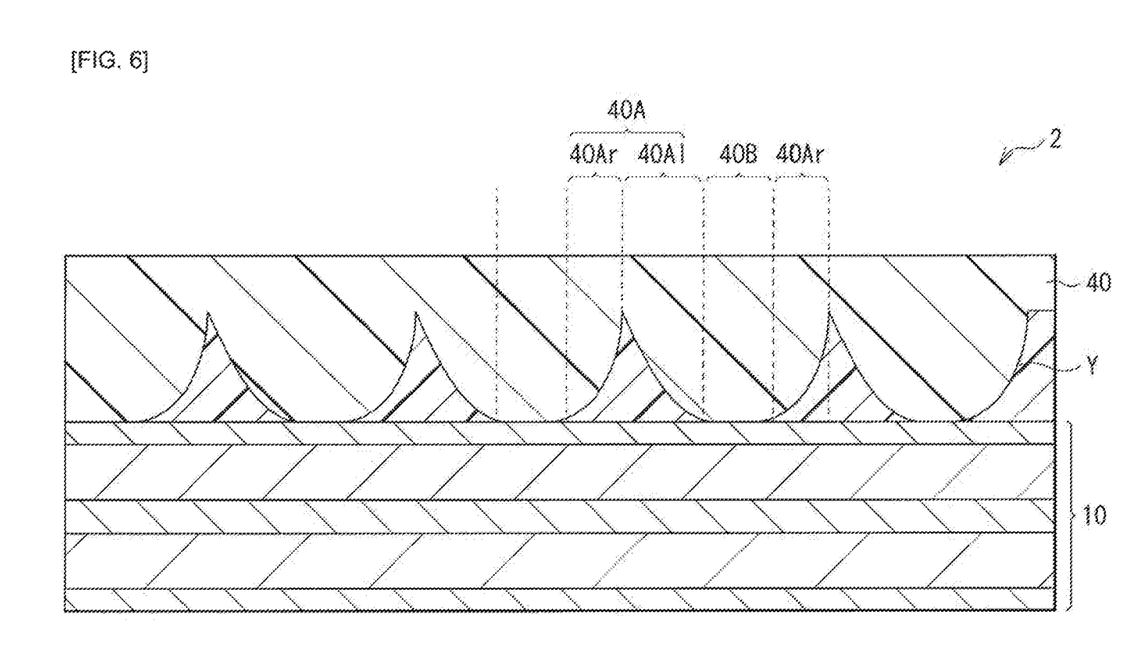
FIG. 6 is a cross-sectional view of a part of a configuration of a display unit according to a modification example of the disclosure.

FIG. 6 illustrates a part of a configuration of a display unit 2 (the display panel 10 and a light-distribution adjustment sheet 40) according to a modification example of the embodiment of the disclosure. As with the above-described embodiment, this light-distribution adjustment sheet 40 includes a plurality of protrusions Y. The plurality of protrusions Y protrude toward the display panel 10, and each include a first region 40A including a curved surface, and a second region 40B including a flat surface. In this modification example, the protrusion Y may include the first regions 40A on both sides of the second region 40B. The curved surfaces formed in the first regions 40A may have curvatures different from each other, which is a point different from the above-described embodiment.

As described, the first regions 40Ar and 40Al may be formed on both sides of the second region 40B. In the first regions 40Ar and 40Al, the respective curved surfaces may have the different curvatures. This makes it possible to horizontally vary a quantity of light refracted toward the front face. In one specific example, the above-described light-distribution adjustment sheet 20, together with the light-distribution adjustment sheet 40, may be rotated 90 degrees about the Y-axis and bonded to the front face of the display panel 10. This makes it possible to improve vertically the viewing angle characteristic of the liquid crystal display in the TN mode in which the viewing angle characteristic greatly varies in an up-down symmetry direction.

3. Application Examples

Application Example 1

Figure 7:
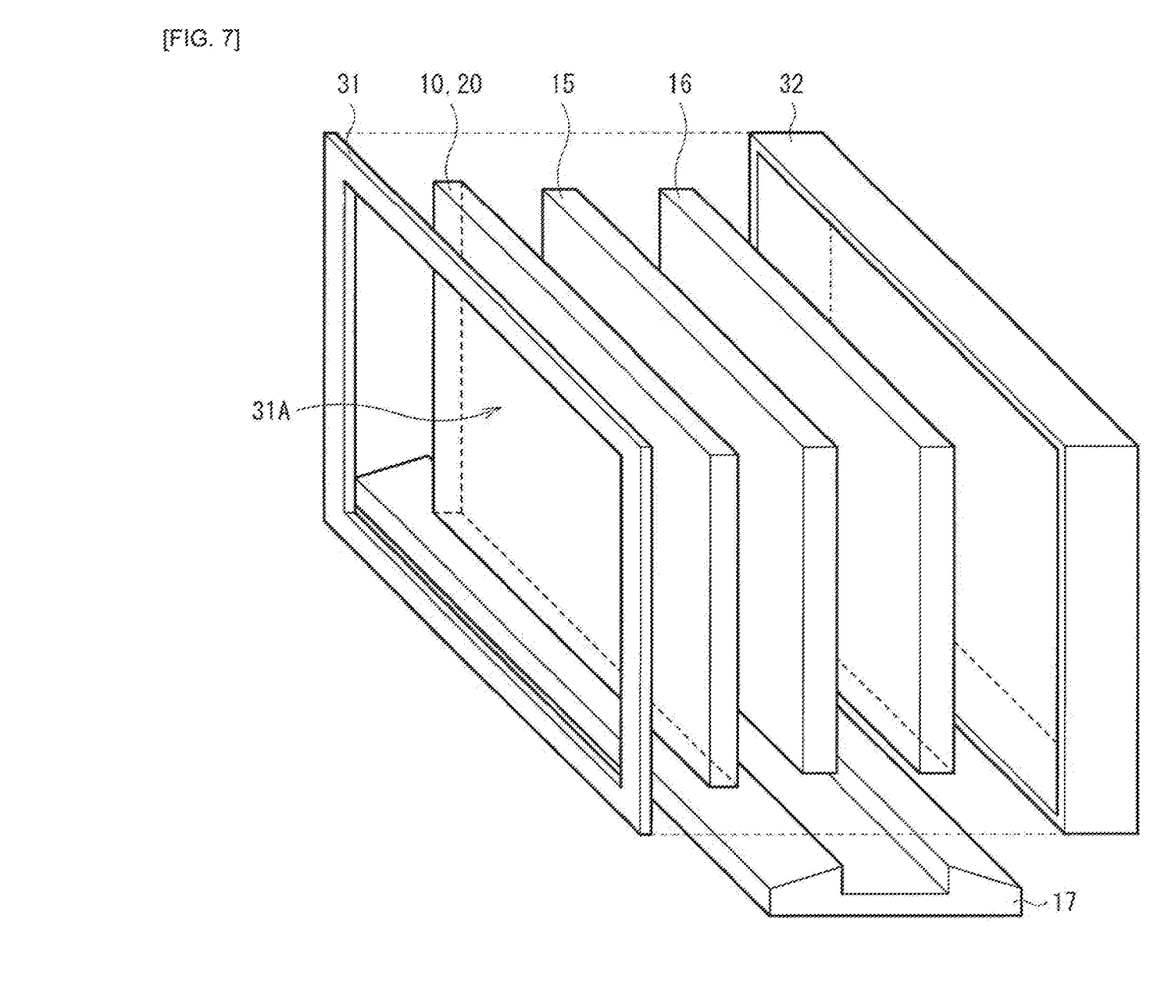
FIG. 7 is an exploded perspective view illustrating an overall configuration of the display unit illustrated in FIG. 1 (Application Example 1).
Figure 8:
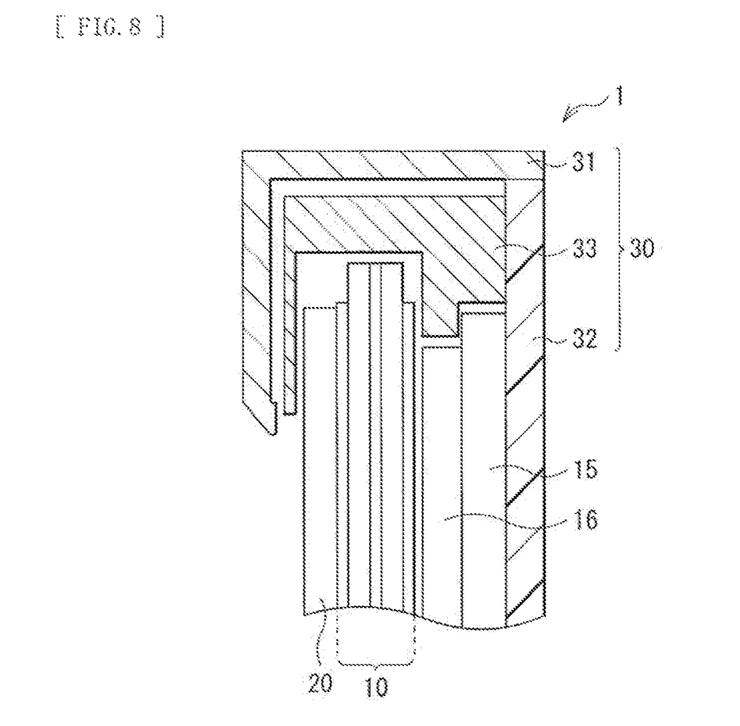
FIG. 8 is a cross-sectional view of the display unit illustrated in FIG. 7.

Each of the display units 1 and 2 described in the above-described embodiment and modification example may be used suitably as, for example, a television apparatus. FIG. 7 illustrates an exploded perspective view of an overall configuration of the display unit 1 (or the display unit 2) as Application Example 1, and FIG. 8 illustrates a cross-sectional configuration of the display unit 1. In this display unit 1, the optical member 15 and a backlight unit 16 other than the display panel 10 may be housed in a housing 30 including a front face member 31 and a back face member 32. The optical member 15 may be, for example, a light-guiding plate and a reflection plate including an optical sheet and a light source, or a light box and other components. The display panel 10 is the above-described display panel 10, and the light-distribution adjustment sheet 20 (or the light-distribution adjustment sheet 40) is disposed on the front face thereof. The display panel 10 including the light-distribution adjustment sheet 20, the optical member 15, and the backlight unit 16 may be adhered to the front face member 31 and the back face member 32 with an adhesion member 33. For example, a plurality of LEDs may be disposed at an end face of the light-guiding plate as the light source, and the display panel 10 may be irradiated with light emitted from this light source through the light-guiding plate, and the light may be extracted as display light on the display-surface side.

The optical sheet may be a sheet that may effect various optical functions for the light that is emitted from the light source and illuminates the display panel 10 through the light-guiding plate. Alternatively, for the optical sheet, for example, there may be adopted a sheet having a function such as a function of resolving the display light that enters the display panel 10 from the light source through the light-guiding plate into entering light and a polarized component perpendicular to the entering light, a function of achieving a wide viewing angle and coloring protection by compensating for a light-wave phase difference, and a function of diffusing the display light. This sheet may be provided as a single layer or each of stacked layers.

The light-guiding plate may propagate the light entering from the light source and guide the light toward the display panel 10, and may have, for example, a rectangular flat plate shape. Examples of a material of the light-guiding plate may include materials having high transparency such as glass, but other material may be adopted if the material allows the light from the light source to propagate. For example, the light-guiding plate may be made of a light scattering material in which fine particles with a light diffusion property are scattered, or a light diffusion material. Specific examples may include acrylic resin, polymethyl methacrylate (PMMA), polycarbonate (PC), cyclic olefin copolymer (COP). A shape, a size, a refractive index, a concentration, concentration distribution, and other features of the light-guiding plate may be adjusted to any values so as to obtain desirable characteristics.

For the light source, for example, besides a white LED (Light Emitting Diode), LEDs emitting red, blue, and green may be also used. In addition, as well as a point light source such as the LED, a line light source such as fluorescent light may be also used. The light source may be provided at an end face (undersurface) of the light-guiding plate, or may be disposed, for example, along four sides of the light-guiding plate.

The housing 30 may have, for example, a substantially rectangular parallelepiped shape, and have two faces facing each other (a front face (a support section that supports the display panel 10) and a back face), and side faces between these two faces. In one specific example, the housing 30 may include a back face plate (the back face member 32) and a front face plate (the front face member 31). The back face plate may house the above-described optical member 15, the backlight unit 16, and other components. The front face plate may be a frame body having an opening 31A in a surface facing the back face member. It is to be noted that the front face member 31 and the back face member 32 may be fastened to each other by, for example, screws (not illustrated).

The front face member 31 may fix the display panel 10 by the adhesion as described above, and seal the backlight unit 16 and other components housed in the back face member 32. Examples of a material of the front face member 31 may include, as with the back face member 32, a metal having high thermal conductivity, specifically, Al, may be used. In addition, Fe or other metals may be also used.

The back face member 32 may house the backlight unit 16 and other component except for the display panel 10 including the light-distribution adjustment sheet 20 as described above, and cover the back faces and the side faces thereof. Examples of a material of the back face member 32 may include a metal having high thermal conductivity, specifically, aluminum (Al), may be used. In addition, other materials such as iron (Fe), and a plastic to which polycarbonate (PC) or ABS resin is added may be also used.

The adhesion member 33 may bond the display panel 10 and other components to the housing 30. Examples of the adhesion member 33 may include adhesives having sufficient adhesive strength and elasticity, specifically, acrylic resin, urethane resin, epoxy resin, vinyl chloride resin, modified silicone resin, and other resins.

As illustrated in FIG. 7, the display unit 1 may be completed by housing the optical member 15 having the optical sheet, the light-guiding plate, the reflection plate, and other components, the backlight unit 16, and other members in the housing 30, and by installing the housing 30 on, for example, a stand 17. The stand 17 may be provided with a drive substrate for the light source, a speaker, and other components. Examples of the stand 40 may include a fixed base (a paper-weight structure) having a rectangular flat plate shape, but this is not limitative. The stand 17 may include a tilt-swivel mechanism that allows orientation of a screen of the display panel 10 to be changed vertically and laterally.

In addition, either of the display units 1 and 2 described in the above-described embodiment and modification example may be used suitably as any of the following electronic apparatuses, besides the above-described television apparatus.

Application Example 2

Figure 9A:
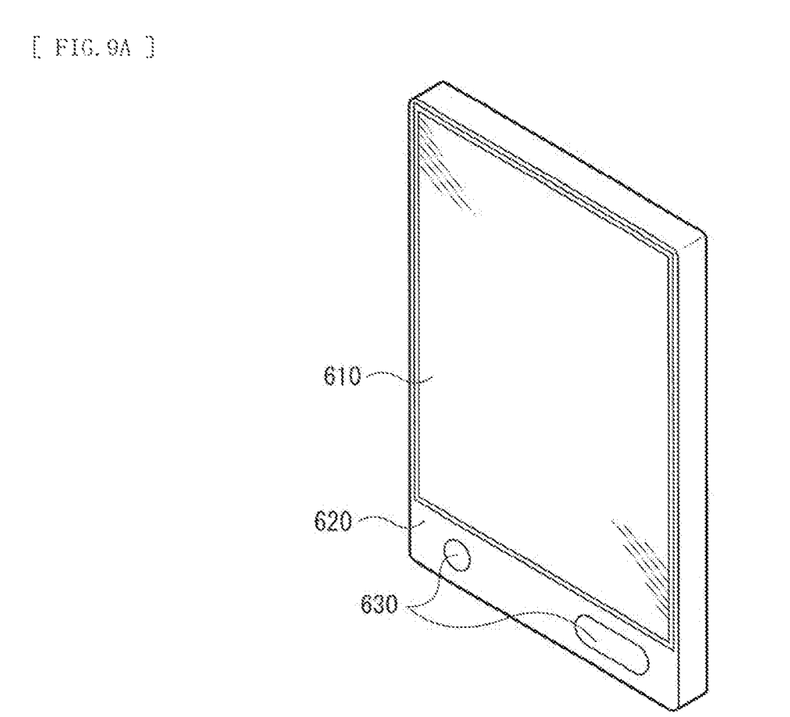
FIG. 9A is a perspective view of an appearance of Application Example 2 of the display unit illustrated in FIG. 1, as viewed from front side.
Figure 9B:
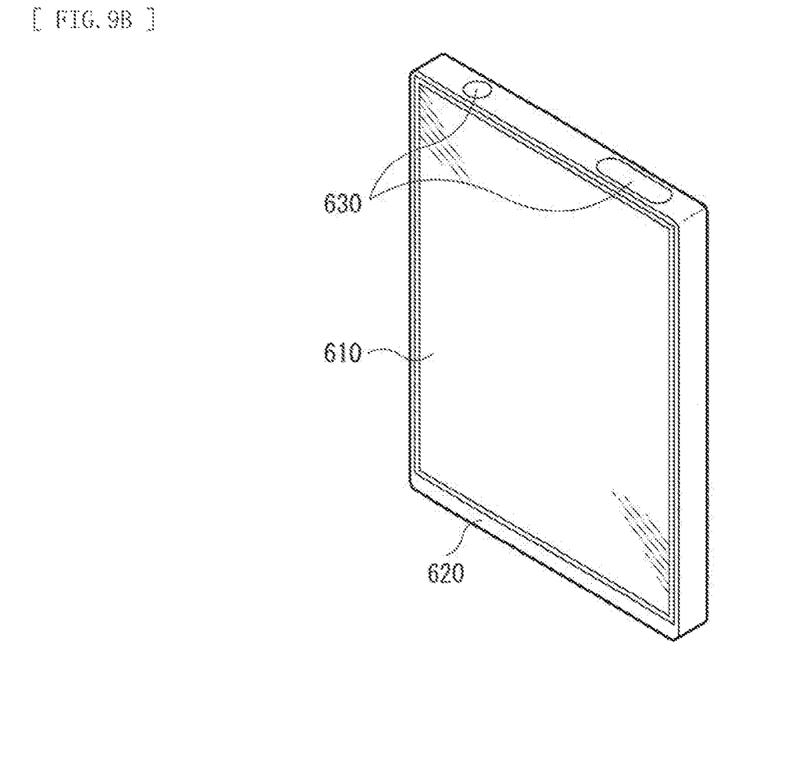
FIG. 9B is a perspective view of an appearance of Application Example 2, as viewed from back side.

FIGS. 9A and 9B illustrate an appearance from front and an appearance from back, respectively, of a tablet to which either of the display units 1 and 2 of the above-described embodiment is applied. This tablet may include, for example, a display section 610 (the display unit 1 or the display unit 2) and a non-display section (a housing) 620, and an operation section 630. The operation section 630 may be provided on a front face of the non-display section 620 as illustrated in FIG. 9A, or may be provided on a top face as illustrated in FIG. 9B.

Application Example 3

Figure 10:
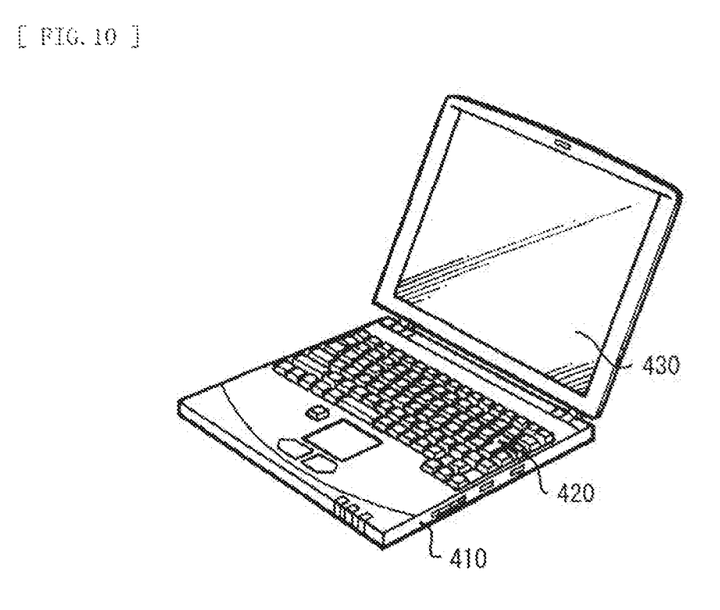
FIG. 10 is a perspective view of an appearance of Application Example 3.

FIG. 10 illustrates an appearance of a laptop personal computer to which either of the display units 1 and 2 of the above-described embodiment is applied. This laptop personal computer may include, for example, a main body 410, a keyboard 420 for operation of inputting letters and other signs, and a display section 430 serving as either of the above-described display units 1 and 2.

Figure 11A:
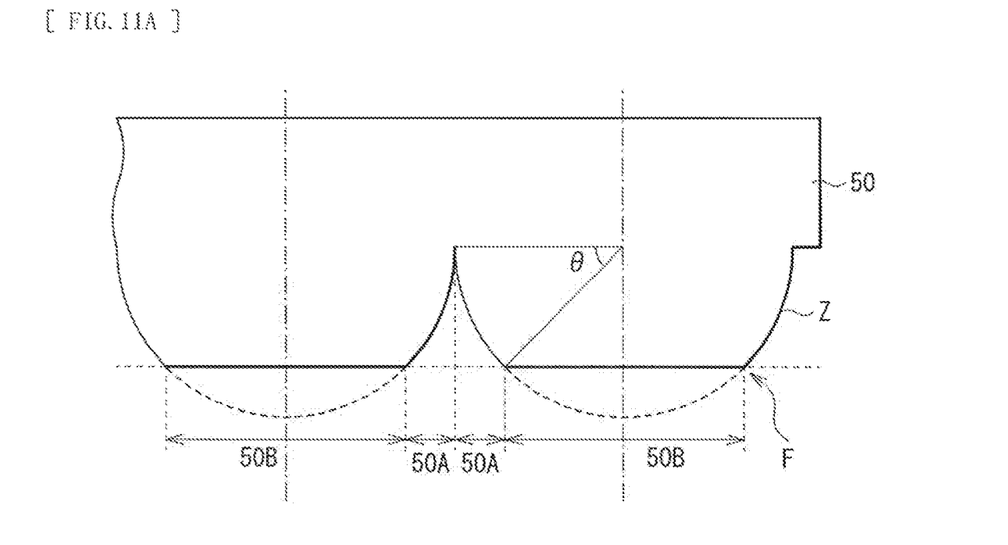
FIG. 11A is a cross-sectional view of an example of a light-distribution adjustment sheet according to another modification example of the disclosure.
Figure 11B:
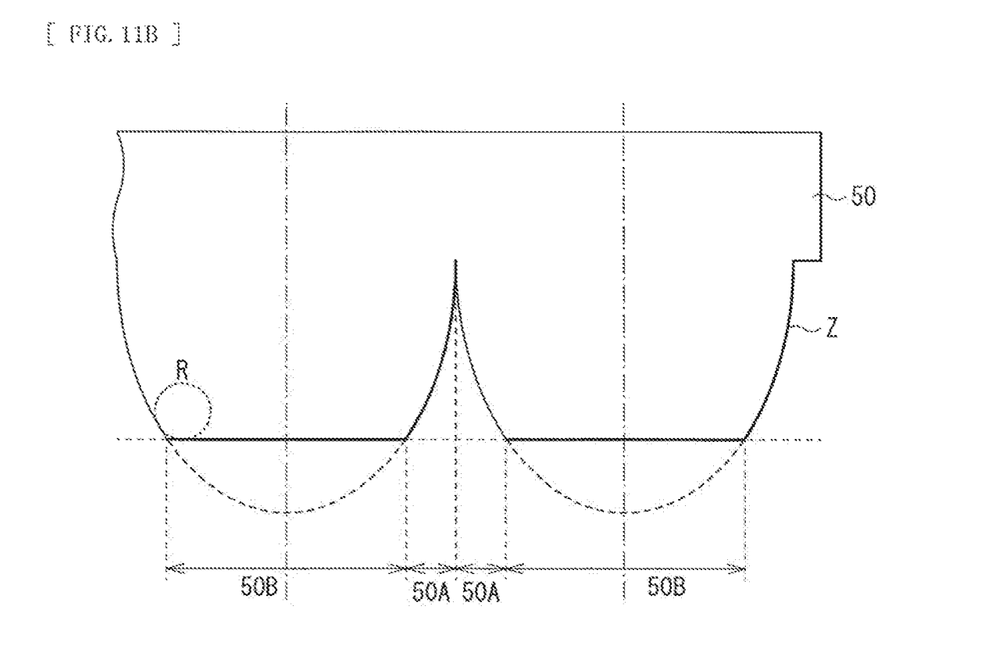
FIG. 11B is a cross-sectional view of another example of the light-distribution adjustment sheet according to another modification example of the disclosure.

Although description has been made by giving the embodiment and the modification example, the contents of the technology are not limited to the above-described example embodiments, and may be modified in a variety of ways. For example, in the above-described example embodiments, the protruding surface S1 of the protrusion X (or the protrusion Y) may include the first regions 20A each including the curved surface, and the second region 20B including the flat surface. The protruding surface S1 of the protrusion X (or the protrusion Y) may form a continuous surface devoid of an inflection point. However, this is not limitative. In the above-described example embodiments, the central angle θ of the first region 20A formed on each of both sides of the second region 20B is π/2 (rad) (i.e., 90 degrees). However, for example, as illustrated in FIGS. 11A and 11B, a circular or oval curved surface may be partially cut, and a surface formed thereby may be provided as a second region 50B. It is to be noted that, in this case, a central angle (angle θ) of a first region 50A may satisfy θ<π/2, and be subject to a restriction on an angle for producing a refractive effect. Therefore, this is effective in a case intended for selective refraction of only steeply angled light. In addition, in such a protrusion Z, a discontinuous point (an inflection point F) may be provided at a boundary between the first region 50A and the second region 50B, which results in formation of a ridge line where abnormal refraction may occur. For this reason, in one preferred example, as illustrated in FIG. 11B, a curved surface along an inscribed circle of a radius R may be formed at the boundary part between the first region 50A and the second region 50B. The inscribed circle may be in contact internally with the curved surface of the first region 50A and with the flat surface of the second region 50B.

In addition, in the above-described example embodiments, each of the display units 1 and 2 is exemplified by the liquid crystal display, but the contents of the disclosure may be applicable to a plasma display or an organic electroluminescent display.

Moreover, each member described in the above-described example embodiments is an example, and it is not necessary to include all the components, or rather, other components may be also included.

It is to be noted that effects described here are merely exemplified and not limitative, and effects of the disclosure may be other effects or may further include other effects.

It is to be noted that the technology may have the following configurations.

(1) A display unit, including:
  a display panel; and
  a light-distribution adjustment sheet that is provided on the display panel, and includes a protrusion that protrudes toward the display panel,
    wherein the protrusion includes a first region including a curved surface, and a second region including a flat surface.
(2) The display unit according to (1), wherein the protrusion includes the second region on each of both sides of the first region.
(3) The display unit according to (1) or (2), wherein the protrusion is devoid of an inflection point between the first region and the second region.
(4) The display unit according to any one of (1) to (3), wherein the protrusion extends in one direction.
(5) The display unit according to any one of (1) to (4), wherein the display panel includes a plurality of pixels, and
  a width of the protrusion in a direction orthogonal to an extending direction is smaller than a width of one pixel.
(6) The display unit according to any one of (1) to (5), wherein the first region and the second region of the protrusion are at a predetermined ratio.
(7) The display unit according to any one of (1) to (6), wherein, in the light-distribution adjustment sheet, a surface treatment is applied to a surface on opposite side to side on which the display panel is disposed.
(8) The display unit according to any one of (1) to (7), wherein the second regions on both sides of the first region have curvatures same as each other.
(9) The display unit according to any one of (1) to (8), wherein the second regions on both sides of the first region have curvatures different from each other.
(10) The display unit according to any one of (1) to (9), wherein the light-distribution adjustment sheet is disposed on the display panel with a resin layer interposed therebetween.
(11) The display unit according to (10), wherein the resin layer is made of a low refractive index resin.
(12) A light-distribution adjustment sheet, including a protrusion that protrudes in one direction,
  wherein the protrusion includes a first region including a curved surface, and a second region including a flat surface.

This application claims the benefit of Japanese Priority Patent Application JP 2014-122801 filed on Jun. 13, 2014, the entire contents of which are incorporated herein by reference.

It should be understood by those skilled in the art that various modifications, combinations, sub-combinations and alterations may occur depending on design requirements and other factors insofar as they are within the scope of the appended claims or the equivalents thereof.

The invention claimed is:

1. A display apparatus, comprising:
  a panel having a layout for a plurality of pixels and a light entrance side opposing a light exit side;
  a light-distribution adjustment sheet positioned over a side of the panel, wherein the light-distribution adjustment sheet comprises a plurality of protrusions in which each pixel of the plurality of pixels is associated with and has disposed therein at least two protrusions of the plurality of protrusions and the protrusions protrude towards the panel; and
  wherein each of the protrusions comprises two opposing first side regions with a second top region therebetween with inflection points connecting the first side regions to the second top region, the two opposing first side regions have elliptical arc forms, and
  wherein each pixel of the plurality of pixels is formed by combining color subpixels.

2. The display apparatus according to claim 1, wherein a pixel width is designated 1 unit and a width of the protrusion is 0.33 units or less.

3. The display apparatus according to claim 1, wherein the second top region is flat.

4. The display apparatus according to claim 1, wherein the color subpixels are formed on a color filter substrate having color filters.

5. The display apparatus according to claim 1, further comprising an antireflection surface treatment on a side of the light-distribution adjustment sheet opposed to a side on which the protrusions reside.

6. The display apparatus according to claim 1, further comprising a protruding side on which the protrusions reside and which is devoid of discontinuous points.

7. The display apparatus according to claim 1, wherein the panel is an organic light emitting panel.

8. The display apparatus according to claim 1, wherein the light-distribution adjustment sheet is formed of polyethylene terephthalate (PET), acrylic resin (PMMA), or polycarbonate (PC).

9. The display apparatus according to claim 1, wherein the light-distribution adjustment sheet is bonded to the panel through an adhesive layer through a resin layer.

10. The display apparatus according to claim 9, further comprising an antireflection surface treatment on a side of the light-distribution adjustment sheet opposed to a side on which the protrusions reside.

11. The display apparatus according to claim 1, wherein a peripheral edge of the panel is sealed with a sealing resin that planarizes a shoulder end face of the panel.

12. The display apparatus according to claim 11, wherein the first regions have curved surfaces.

13. The display apparatus according to claim 11, further comprising a protruding side on which the protrusions reside and which is devoid of discontinuous points.

14. The display apparatus according to claim 1, wherein the first regions have curved surfaces.

15. The display apparatus according to claim 1, further comprising a plurality of light sources, an optical sheet, and a reflector.

16. The display apparatus according to claim 15, wherein the light sources are LEDs.

17. The display apparatus according to claim 16, wherein the panel is a liquid crystal panel.

18. The display apparatus according to claim 1, further comprising a protruding side on which the protrusions reside, the protruding side faces the panel.

19. The display apparatus according to claim 1, wherein the light-distribution adjustment sheet is bonded to the panel through an adhesive layer.

20. The display apparatus according to claim 1, wherein the panel is a liquid crystal panel.

\* \* \* \* \*